May 22, 1956     W. E. SMITH ET AL     2,746,372
AIR CONDITIONER FOR AUTOMOBILES
Filed Oct. 31, 1951     3 Sheets-Sheet 1

Willis E. Smith
James R. Shipman
INVENTOR.

ATTY

Willis E. Smith
James R. Shipman
INVENTOR.

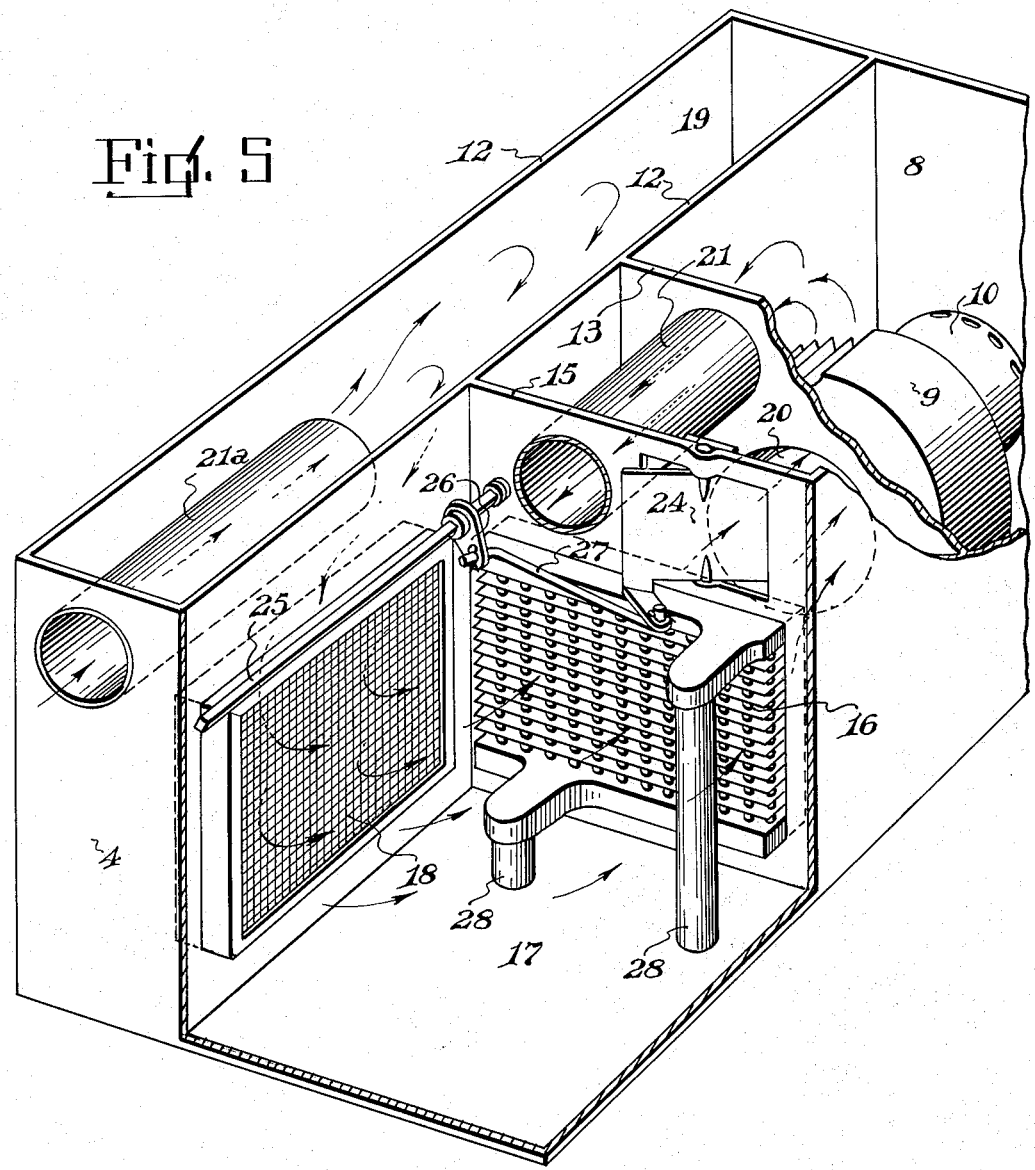

United States Patent Office 2,746,372
Patented May 22, 1956

2,746,372
AIR CONDITIONER FOR AUTOMOBILES

Willis E. Smith and James R. Shipman, Tulsa, Okla.

Application October 31, 1951, Serial No. 254,132

4 Claims. (Cl. 98—2)

The invention relates to air conditioners for automobiles, particularly when parked in open air theaters and the like, winter and summer, and has for its object to provide a device of this kind beside which a car may park and heated or cold air circulated from the conditioner to the interior of the automobile.

A further object is to provide the conditioner with means whereby cars on opposite sides thereof may be serviced with conditioned air, and the flow of air regulated from within either car.

A further object is to provide the conditioner with outward slidable conduits, preferably flexible and which conduits terminate in the cars and form means whereby air is simultaneously allowed to be sucked from the cars by the conditioner and simultaneously supplied with conditioned air from the conditioner.

A further object is to provide the extensible conduits with a plate adapted to engage over the upper edge of a door window of the automobile and within the window opening in engagement with the upper side of the window frame opening, and to support the flexible conduits at their outer ends and attach the same to the car.

Also to provide damper means in the window receiving plate, and by means of which damper means additional fresh air may be added to the recirculating air from the inside of the car and the air conditioning device.

A further object is to provide means whereby the recirculating air to both cars is filtered and passed through a conditioning unit for heating or cooling before again entering the car compartment.

A further object is to provide means for regulating the temperature of the air through the medium of a vent damper which allows a regulated amount of the recirculating air to by-pass the radiator and to control the damper from within the parked automobile.

A further object is to provide the air conditioner with means in the form of a double system intaking and discharging in opposite directions so that automobiles on opposite sides of the conditioner may be serviced.

A further object is to support the conditioner on a standard between the cars, and to service both cars from the conditioner.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 5 is a perspective view of one side of the air conditioner, parts being broken away to better show the structure.

Figure 2:
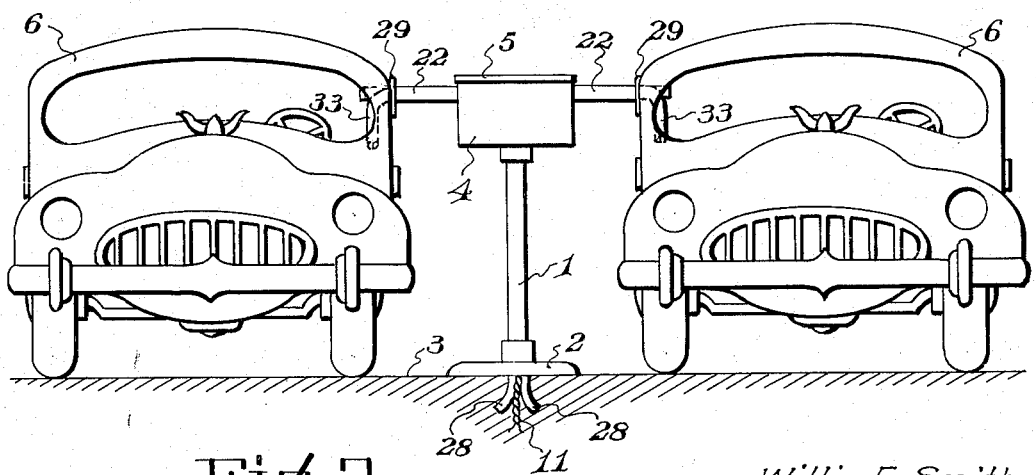
Figure 2 is a front elevation of the conditioner showing its position between automobiles to be air conditioned.

Referring to the drawings, and particularly to Figure 2, the numeral 1 designates a tubular standard having a base 2, which base may be anchored to the ground 3 in any suitable manner. Supported on the upper end of the standard 1 is the conditioner casing 4 having a removable closure 5. The device is adapted for use on outdoor motion picture lots and the like, and the automobiles 6, to be conditioned, are parked on opposite sides of the device, as clearly shown in Figure 2, and to be serviced with recirculating air through their window openings above the slidable glass.

Figure 3:
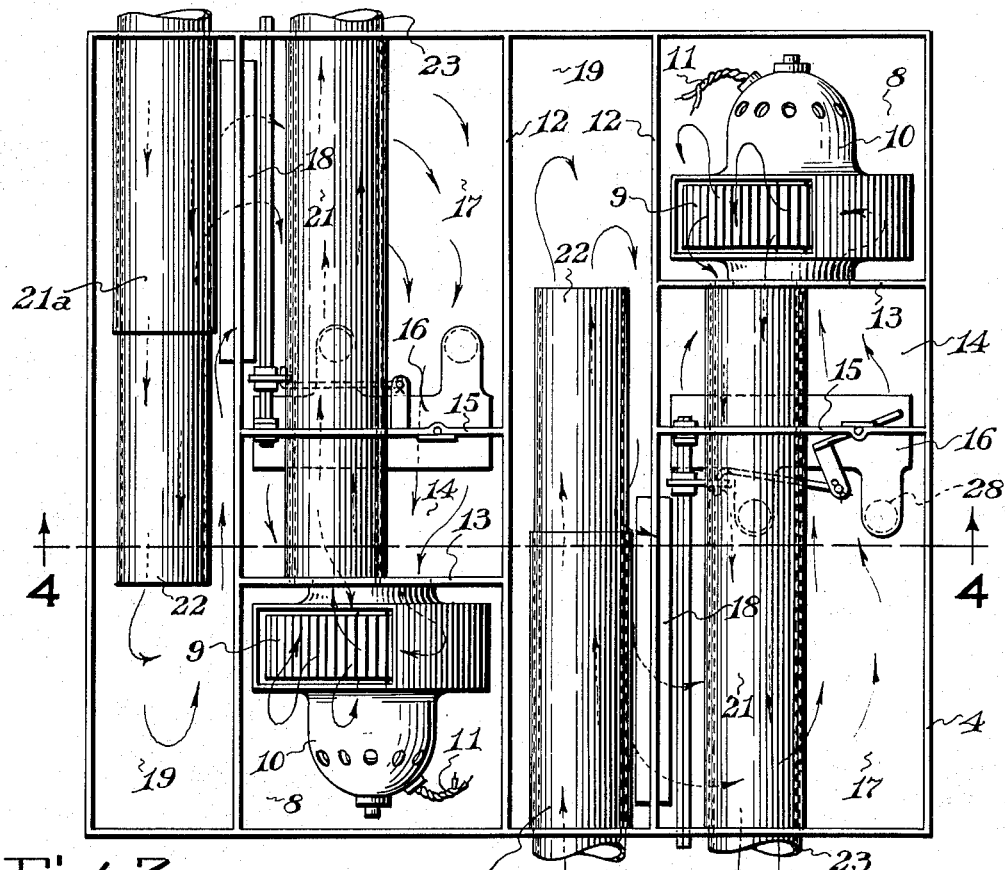
Figure 3 is a top plan view of the air conditioner.
Figure 4:
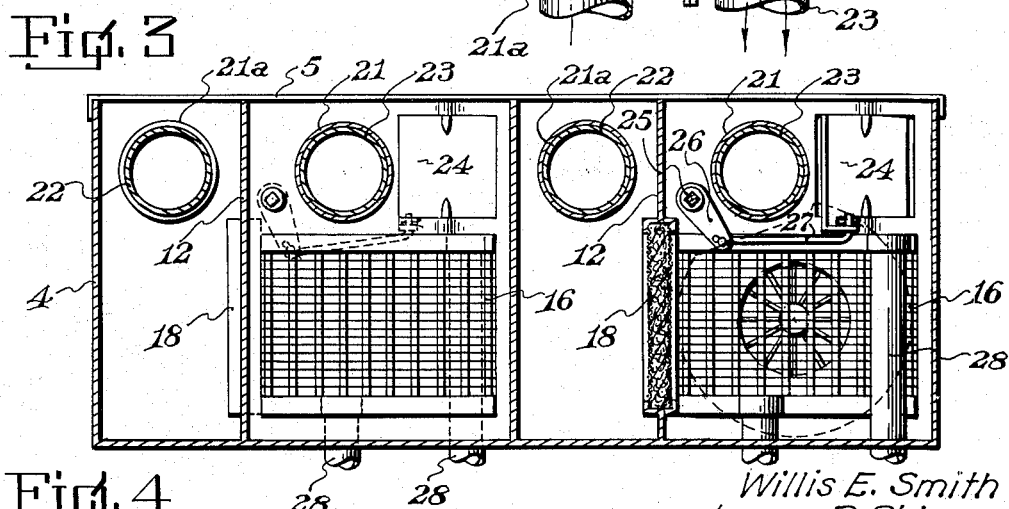
Figure 4 is a vertical transverse sectional view through the air conditioner taken on line 4—4 of Figure 3.

Referring to Figure 3, the air conditioner is of a double unit type, and the units are in reverse relation to each other for servicing cars at opposite sides of the conditioner, therefore the same numerals will apply to both units.

Disposed within the casing 4 and in independent compartments 8 are circulating fans 9. Fans 9 are electrically driven by motors 10, which get their current through conductors wires 11 leading to any source of supply, however said wires extend downwardly through the tubular standard 1 and base 2. Fan compartments 8 are defined by partitions 12 and cross partitions 13, clearly shown in Figure 3. Disposed in compartments 14, formed by partitions 15 and supported in the partitions 15 are radiators 16 through which air is sucked by the fans from the large compartments 17. Supported within the outer partitions 12 are filters 18, through which filters the air is sucked from the compartments 19 by the fans. The air enters the compartments 19 in a stale condition from the cars 6 through mechanism hereinafter set forth. The course of the air is from compartments 19 through the filters 18, through the compartments 17 and openings 20 axially of the fans 9 and thence outwardly from the fans into the compartments 8 and through the tubular members 21 which extend through the partitions 13, 15, and the casing wall, therefore it will be seen that the air entering the device through the slidably mounted flexible members 22, leading from the cars, will circulate through the filters, through the radiators, and thence through the fans and discharged back to the automobiles through the flexible pipes 23 after heating or cooling, according to winter or summer use, or the desires of the occupants of the automobiles. This recirculating air can be regulated as to temperature by allowing a portion of the air to by-pass the radiators 16 by opening the by-pass dampers 24. Dampers 24 are controlled by a rock shaft 25 having an arm 26 connected to the dampers by connecting rod 27, hence it will be seen that part of the air can by-pass the radiators without being subjected to the heating and cooling action thereof. It will be understood that a constant temperature of the fluid passing through the radiators is maintained from a central plant, and this fluid is supplied to the radiators through supply and return pipes 28, clearly shown in Figures 1 and 5.

The flexible members 22 and 23 may be formed of rubber or any other flexible material, and they are slidably mounted in the tubular members 21 and 21a. It will be noted that the tubular members 21 are rather short in relation to the stale air compartments 19 to give considerable sliding action to the flexible conduits so that the cars will not have to maneuver to get to a particular position or distance from the sides of the conditioner.

Figure 1:
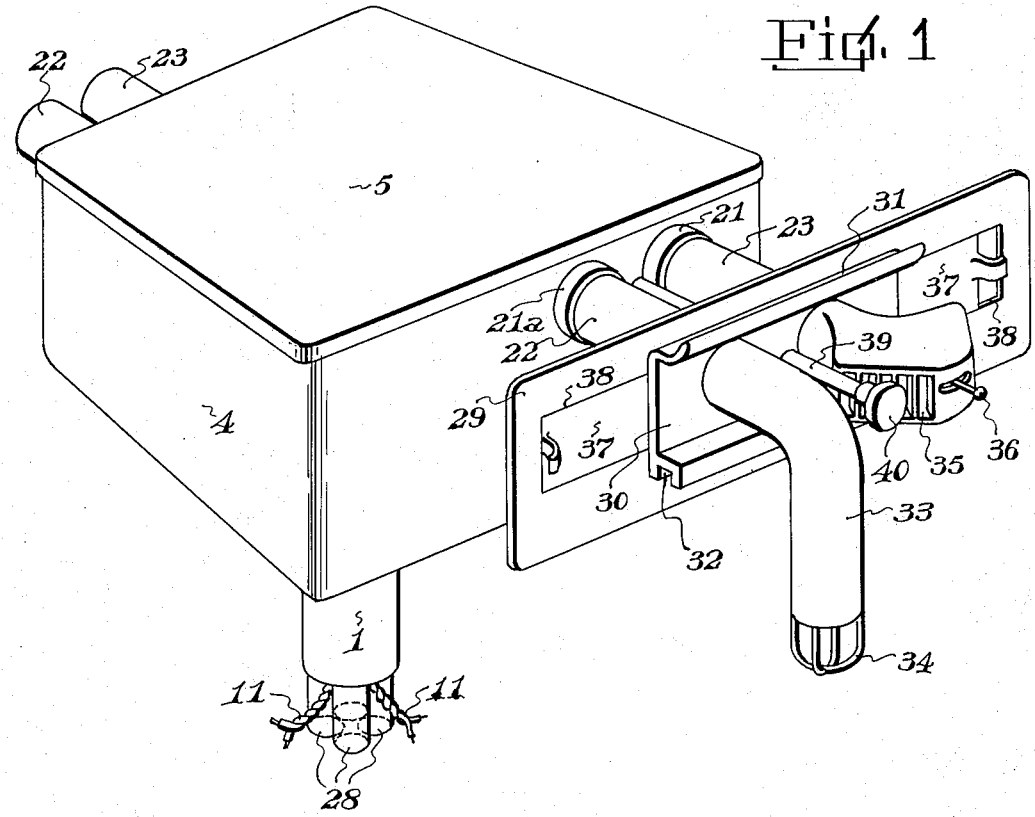
Figure 1 is a perspective view of the air conditioner showing one of the window receiving plates.

Mounted on the outer ends of the flexible members 23 are car engaging plates 29, one of which is shown in Figure 1. Plate 29 is preferably provided with a layer of sponge rubber or felt to prevent the plate from marring the car, however, the plate is adapted to register with the opening above a partially opened window and provided with an inner plate 30 having a channel 31 at its upper edge for engaging the inner side of the window opening frame, and with a channel 32 at its lower side for reception of the upper edge of the glass window, therefore it will be seen that when the device is properly positioned and the glass moved towards closed position, the device will be supported and attached to the car. Flexible pipes 22 extend downwardly and have angular portions 33, preferably screened as at 34, and through which pipes 22 the stale air is sucked from the cars, reconditioned and then discharged through the flexible pipes 23, back into the cars through the grilled heads 35. The grilled heads 35 may be controlled with damper means 36 if desired.

Slidably mounted in the plates 29 are dampers 37 controlling damper openings 38, and by opening said dampers 37 additional fresh air may be admitted to cars for addition to the recirculating air between the conditioners and the car compartments. The damper control rod 25 has a slidable engagement within a tubular member 39 extending through plates 29 and 30, and is provided with a knob 40 adapted to be grasped by the operator for controlling the dampers 24 within the conditioner for regulating the heat or cold by allowing a regulated amount of air to by-pass the radiators.

From the above it will be seen that an air conditioning device is provided for air conditioning cars on outdoor parking lots, for instance outdoor motion picture parks, and by providing flexible extensible conduits and means for attaching the ends of the conduits to a car for sucking air from the car and discharging conditioned air into the car, and the car attaching ends are supported within the partially open space above the car window.

The invention having been set forth what is claimed as new and useful is:

1. An air conditioning device for conditioning air inside of a pair of parked side by side automobiles comprising a casing adapted to be fixedly mounted on the ground and alongside of which the automobiles are parked, said casing having separate compartments, a partition dividing each compartment into separate air outlet and air return chambers, said partition having an opening communicating the chambers for the passage of return air from the return chamber to the outlet chamber, filter means mounted in said opening for filtering the air as it passes from the return chamber to the outlet chamber, a fan unit mounted in the outlet chamber of each compartment for drawing the air from the return chambers to the outlet chambers and exhausting it from the outlet chambers, heat exchange means interposed in the air stream between the return chambers and the outlet chambers for heating or cooling the air, axially adjustable air outlet pipes extending from opposite sides of the casing and communicating with the air outlet chambers, axially adjustable air return pipes extending from opposite sides of the casing and communicating with the air return chambers in each compartment, a plate to which the air outlet and return pipes from each side of the casing are attached, each of said plates having means for mounting it in a window opening in the automobile, temperature control means operatively associated with each of the heat exchange means for controlling the temperature of the air being recirculated, operating means carried by each of the plates for operating said control means from within each automobile, and adjustable vent means in each plate operable from inside each automobile for venting the interior thereof to the atmosphere.

2. An air conditioning device as claimed in claim 1, wherein said temperature control means includes dampers positioned in the path of the air flowing from the return chambers to the outlet chambers and in advance of the heat exchange means and operative to by-pass part of the air from passage over the heat exchange means.

3. An air conditioning device as claimed in claim 1, wherein said operating means includes rods slidably carried by the plates and connected inside the casing to the temperature control means.

4. An air conditioning device as claimed in claim 1, wherein said air outlet pipes terminate at the plates in grills and said grills have adjustable dampers.

References Cited in the file of this patent
UNITED STATES PATENTS

| | | |
|---|---|---|
| 940,590 | Gay | Nov. 16, 1909 |
| 1,750,789 | Thompson | Mar. 18, 1930 |
| 2,091,594 | Innes | Aug. 31, 1937 |
| 2,125,646 | Nessel | Aug. 2, 1938 |
| 2,529,425 | Sharp | Nov. 7, 1950 |
| 2,537,330 | Carroll | Jan. 9, 1951 |
| 2,588,086 | Cole | Mar. 4, 1952 |